(12) United States Patent
Zhao et al.

(10) Patent No.: US 12,537,844 B1
(45) Date of Patent: Jan. 27, 2026

(54) SYSTEMS AND METHODS FOR AUTOMATED WEBSITE SECURITY TESTING

(71) Applicant: Amazon Technologies, Inc., Seattle, WA (US)

(72) Inventors: Ling Zhao, Bellevue, WA (US); Eric Frank Rizzi, Detroit, MI (US); Karthik Menon, Calicut (IN); Gopalakrishnan Banugopan, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 352 days.

(21) Appl. No.: 18/067,343

(22) Filed: Dec. 16, 2022

(51) Int. Cl.
*H04L 9/40* (2022.01)

(52) U.S. Cl.
CPC ........ *H04L 63/1433* (2013.01); *H04L 63/145* (2013.01); *H04L 63/20* (2013.01)

(58) Field of Classification Search
USPC .......................................................... 726/22
See application file for complete search history.

(56) References Cited

U.S. PATENT DOCUMENTS

| | | | |
|---|---|---|---|
| 2015/0100684 A1* | 4/2015 | Maes | G06F 8/60 709/224 |
| 2018/0205600 A1* | 7/2018 | Burton | H04L 67/1097 |
| 2021/0405976 A1* | 12/2021 | Gaitonde | G06F 8/33 |
| 2022/0006829 A1* | 1/2022 | Nikam | H04L 67/02 |
| 2022/0108020 A1* | 4/2022 | Dang | G06F 8/658 |

* cited by examiner

*Primary Examiner* — Sanchit K Sarker
(74) *Attorney, Agent, or Firm* — Eversheds Sutherland (US) LLP (57) ABSTRACT

Systems and methods are provided for automated website security testing. The systems and methods reduce or eliminate the need for a user to manually click through a web application to perform application security testing by embedding one or more API calls to the application security testing service within an already-existing automated user interface test. When a web page is reached during the user interface that that is desired to be tested using the application security test, a cookie associated with the web page is obtained and provided to the API associated with the application security test. The application security test then returns a result and the user interface test continues. Any number of additional API calls for to the application security test service may be performed for any other number of web pages as the user interface test progresses through the web pages as well.

14 Claims, 8 Drawing Sheets

SYSTEMS AND METHODS FOR AUTOMATED WEBSITE SECURITY TESTING

BACKGROUND

Application security testing refers to methodologies used to find and eliminate software vulnerabilities. One specific type of application security testing is dynamic application security testing (DAST). DAST is an effective security tool to scan web applications and detect common security vulnerabilities such as cross-site scripting (XSS) and SQL injection (SQLi). These issues, if exploited, may have serious customer impacts such as account takeover and sensitive data exposure. DAST as a proactive security initiative helps address the problem of security being an afterthought by embedding it directly in the SDLC. Currently, onboarding endpoints for DAST scanning may require significant manual effort (for example, over four hours per test case) as the majority of these endpoints may require performing customer actions on a sequence of pages (e.g., user journeys) to navigate to the landing page properly. The user journeys scripts may need to be manually created and maintained and fed to DAST to scan endpoints in the right state. This process may be time consuming, difficult to maintain, and may not effectively scale.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, devices, systems, methods, computer-readable media, techniques, and methodologies for automated website security testing. Particularly, the systems and methods may involve the integration of an application security test within a user interface (UI) test. An application security test may generally involve providing special payloads associated with a web page of a website to a web request and receiving a response indicating if any security vulnerabilities exist in the web page (it should be noted that while reference may be made herein to a specific type of application security test, such as DAST, this is not intended to be limiting and any other application security test may similarly be applicable). For example, an application security test may automatically perform checks for cross-site scripting and other types of potential vulnerabilities. It is common to run an application security test on web endpoints to prevent exploitation of a website in production. However, conventional approaches to application security testing require a user to manually progress through a user journey to perform the test. For example, the user may need to manually navigate to each web page to be tested and enter information (e.g., log in information, purchase information, etc.). Another option may involve using a manually generated script to progress through the user journey. Although this provides some level of automation to the process, this approach still requires a manual update of the script when UI changes are made to the website.

By integrating the application security test into an existing UI test for a website, the efficiency of the application security test may be significantly improved, and, in some cases, the application security test may be fully automated. To facilitate the integration of the application security test into the UI test an application programming interface (API) call may be made at various points during the UI test to perform an application security test for a web page that is currently being tested (or is about to be tested) by the UI test. Any number of these API calls may be embedded within the UI test such that application security tests for various web pages may be performed as the UI test progresses through a "user-journey" associated with a given website. By embedding the API calls for the application security test within the UI test, a significant bottleneck (requiring a user to manually "click-through" a user journey to open various web pages for testing) in the application security test process is eliminated to allow for more efficient application security testing. Using these methods, service owners may only need to establish a user journey once (through the development of the UI test), as the application security test may then piggyback on the automated user journey already established through the UI test. In some cases, the entirety of the process may be automated and no manual user input may be required (even to initially establish the user journey). While reference may be made herein to a "website," these systems and methods may not necessarily just be limited to website testing but may also be applicable to other types of software testing as well.

A UI test (which may also be referred to as a "graphical user interface (GUI) test") is part of software development lifecycle used to validate the portions of a website or application that users interact with. For example, this may entail testing the visual elements to ensure that they are functioning according to specifications (e.g., in terms of visual appearance, functionality, performance, etc.). The UI tests cover a wide range of visual indicators and graphic-based icons, such as toolbars, fonts, menus, text boxes, radio buttons, checkboxes, colors, etc.

A user journey may be a series of steps taken by a user when navigating through the UI and interacting with the various elements of the UI. For example, if the website is an online retail shopping platform, a user journey may include navigating to a home page of the online retail shopping platform, entering a search string to generate a search results page including various product listings that are relevant to the search string, selecting a specific product in the search results page to navigate to a detailed product description page for the product, adding the product to a virtual shopping cart, and navigating to a web page to purchase the product. This is merely one exemplary user journey and a user journey may also involve any other user interactions with any of the web pages of a website, including any elements within any of the web pages.

For purposes of these systems and methods, the user journey may be initially pre-defined by a user and then the UI test may automatically progress through the user journey for any UI tests that are performed based on that user journey. In some cases, the user journey may also be automatically established by the UI test based on an algorithm, which may include a machine learning model and/or any other types of artificial intelligence. For example, the algorithm may identify that the website may be an online retail shopping platform that offers users the ability to purchase products. The algorithm may then automatically determine a user journey involving selecting a product for purchase and performing the purchase. As another example, the algorithm may automatically establish a user journey for testing UI associated with user account login or a user journey for testing UI associated with product searches. In further cases, the UI test may automatically identify all the elements of a UI for a given website and may simply progress through testing every element. These are merely examples of different types of user journeys that the algorithm may identify and are not intended to be limiting. Additionally, a UI test may also progress through multiple different types of user journeys intended to test different portions of the website as well.

The one or more actions that are performed during the automated testing may include any interactions that may be performed within the website. Non-limiting examples of such interactions may include selecting buttons, clicking links, entering information into input fields, hovering a cursor over an element to produce a pop-up box, and/or any other types of interactions. These automated actions may mimic actions that would be taken by a user who is browsing and interacting with the website in a live environment (for example, a user browsing a production online retail shopping platform to make a purchase of a television or any other product). An example user journey and one or more actions performed throughout the example user journey are illustrated in the use case 100 of FIGS. 1A-1D.

In one or more embodiments, the automated progression through the user journey and the testing of the website may be initiated by the UI test. When the UI test reaches a point in the test where an API call to an application security test is embedded, a first API may be called to obtain a URL and any cookies associated with the web page (as well as any other types of information associated with the web page that may be used with the application security test). A second API associated with the application security test may then be called to initiate the application security test for the web page. The URL and the cookie obtained using the first API may be provided to the application security test using the second API. In some cases, a single API call may be made to perform both of these tasks and/or any other number of API calls may be made. The application security test may then be performed for the particular web page and the result of the application security test may be returned. For example, the result may either be an indication that one or more security vulnerabilities exist within the web page or that no security vulnerabilities exist within the web page. After the application security test has been performed, the UI test may proceed through the user journey until another embedded API call for an application security test is reached or the UI test has been completed.

In some instances, the specific points within the UI test at which the application security test is performed may be manually embedded by a user. For manual determinations, a user may pre-determine which web pages require application security testing within a given user journey being tested and may embed an API call to the application security test (as well as an API call to obtain the URL and cookie associated with that web page) into portions of the UI test where the particular web page is tested by the UI test. This approach may be beneficial if there are specific web pages that are already pre-determined to be potentially vulnerable and thus suitable for application security testing.

In some instances, the points within the UI test at which the application security test is performed may also be automatically determined by the system. For example, a machine learning model (which may be the same model mentioned above or a different model) may be trained to identify web pages accessed by the UI test that may potentially be candidates for application security testing. Any other type of artificial intelligence or logic-based algorithm may also be used as well. The model may obtain information about the contents of a particular web page through an HTML file associated with the particular web page. Using the HTML file, the model may identify elements included within the web page that may be associated with vulnerabilities. This determination may be made based on any number of factors, such as a web page that requires user input into the web page and/or a web page that specifically requires personally identifiable information (PII) input, such as a name, address, credit card information, the web page including specific keywords, etc. The specific portions of a website for which an application security test may be performed may also be automatically determined in any other manner as well.

The systems and methods described herein provide a number of benefits over traditional application security testing. First, as UI tests typically run on pre-production environments, the DAST integration allows service owners to proactively detect security issues before production release and to prevent serious vulnerabilities from leaking to production. Second, the integration may be independent of the language and platform a UI test framework uses, and thus any UI test framework can be integrated to DAST scanning as long as it can fetch browser state through URL and cookies. DAST scans can also simulate different browser types (desktop or mobile). Third, the web API allows DAST engine details to be shielded from UI test frameworks, so DAST scanners may easily be added as long as the DAST scanners support browser cookie transfer. Fourth, the integration may use auto-generated validation keywords to confirm page state transfer is successful so that pages reached by UI tests in the test pipeline are the pages scanned by DAST engine through a web API call. This integration may remove a major customer pain point where manual DAST onboarding may be required for endpoints that depend on customer actions. This approach described herein may result in the service teams only needing to integrate DAST with a test frameworks once, and all existing and future tested endpoints will be automatically onboarded to DAST with no extra effort.

Turning to the figures, FIGS. 1A-1D illustrate an example use case 100 in accordance with one or more example embodiments of the disclosure. The use case 100 illustrates a progression of a UI test through one or more web pages associated with a website, including automated actions performed by the UI test and/or an application security test embedded within the UI test as the UI test progresses through the various web pages. That is, rather than the actions illustrated in FIGS. 1A-1D being manually performed by a user during the testing, the actions may be automatically performed based on instructions provided by the UI test. In this particular use case 100, the website is associated with an online retail shopping platform, however, this is merely exemplary and these same methods may be applied to any other type of website as well.

Beginning with FIGS. 1A-1D, a first web page 102 and a second web page 104 are shown. The first web page 102 may be a starting point of the user journey associated with the UI test for the website. Specifically, the first web page 102 may represent a home page of the website. The user journey in this use case 100 may refer to a pre-determined series of actions that are automatically performed to test various aspects of certain web pages associated with the online retail shopping platform. In some instances, a user journey may simply involve testing all the potential UI elements associated with each web page of the website to ensure proper functionality. However, in the use case 100 shown in FIGS. 1A-1D, the user journey may only involve testing specific elements of the website. For example, the user journey shown in the use case 100 involves automatically selecting elements and providing input information to test UI elements associated with a user account login and purchase of one specific item. In this test, the user journey may involve inputting a search for an item, selecting an item in a search results page to navigate to a product page associated with the item, selecting a UI element to place the item in a virtual shopping cart, selecting an element to navigate to the virtual shopping cart, performing a user account log in, and entering purchase information to complete the purchase of the item in the virtual shopping cart.

Figure 1A:
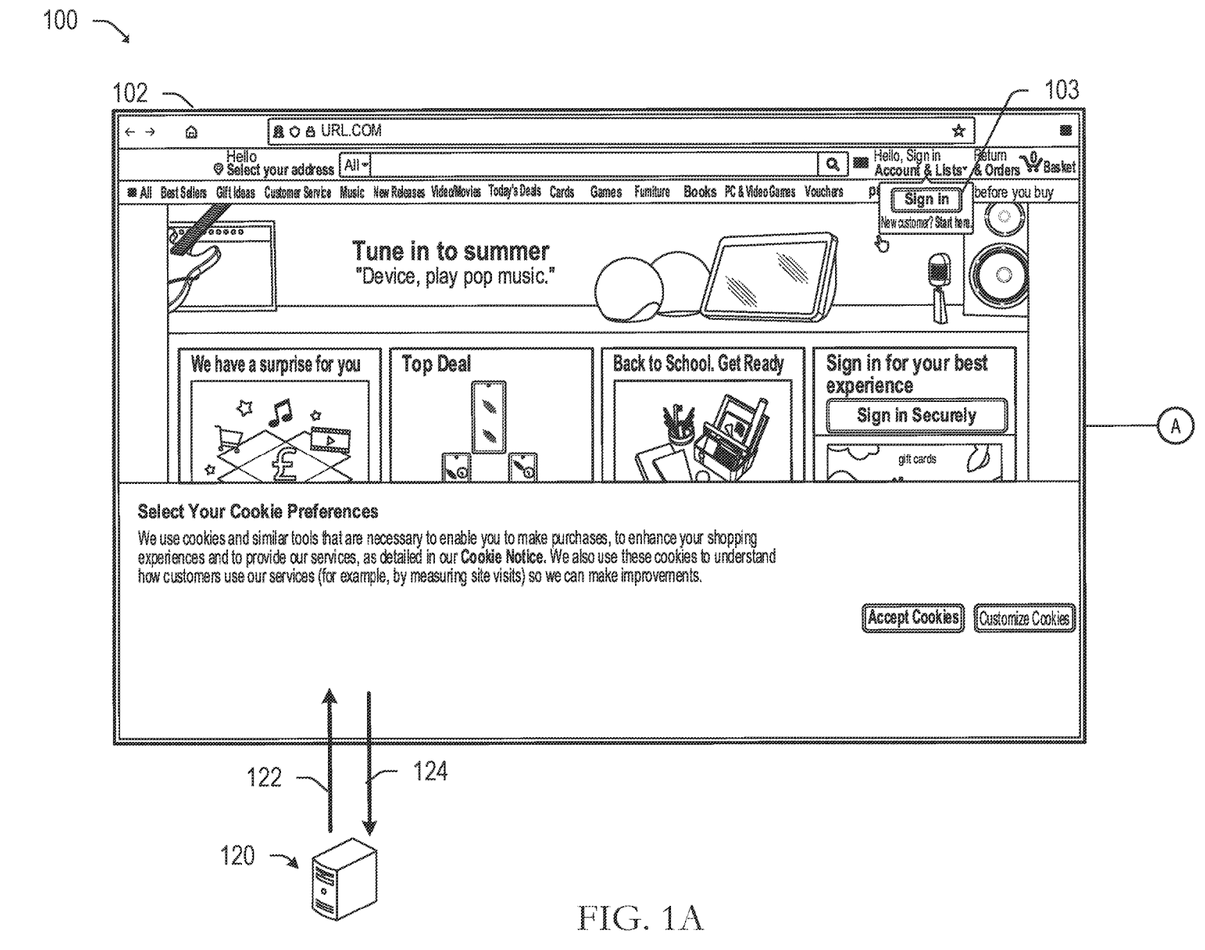
FIGS. 1A-1D illustrate an example use case in accordance with one or more example embodiments of the disclosure.

The first web page 102 may be accessed automatically by the UI test. Once the first web page 102 has been accessed, the UI test may proceed with automatically performing one or more actions to test various portions of the UI associated with the first web page 102. Non-limiting examples of actions may include hovering a cursor over an element to determine if a pop-up box appears, selecting a link to ensure that the website navigates to a proper web page associated with the link, entering a search string into a search bar to determine if the search bar allows user input, pressing a button to initiate the search associated with the search string to determine if the web site navigates to a search results page, selecting an element to attempt to generate a user account log-in pop-up box, and/or any other types of actions that may potentially be performed with respect to the UI of the home page.

Any of these actions may be automatically performed by a system 120 on which the UI test is running. The system 120 may send one or more instructions 122 to perform various actions within the first web page 102 and may receive any results 124 that occurred based on the actions. For example, the system 120 may send an instruction to hover a mouse cursor over a button and click on the button. The result of this action may be that a pop-up dialogue box appears including a "sign-in" button. The system 120 may continue to send instructions to progress through the various actions performed for the UI test. The system 120, for example, may be the same as user device 302, computing systems 320, 330, and/or 340, computing device 400, and/or any other system or device described herein.

Figure 1B:
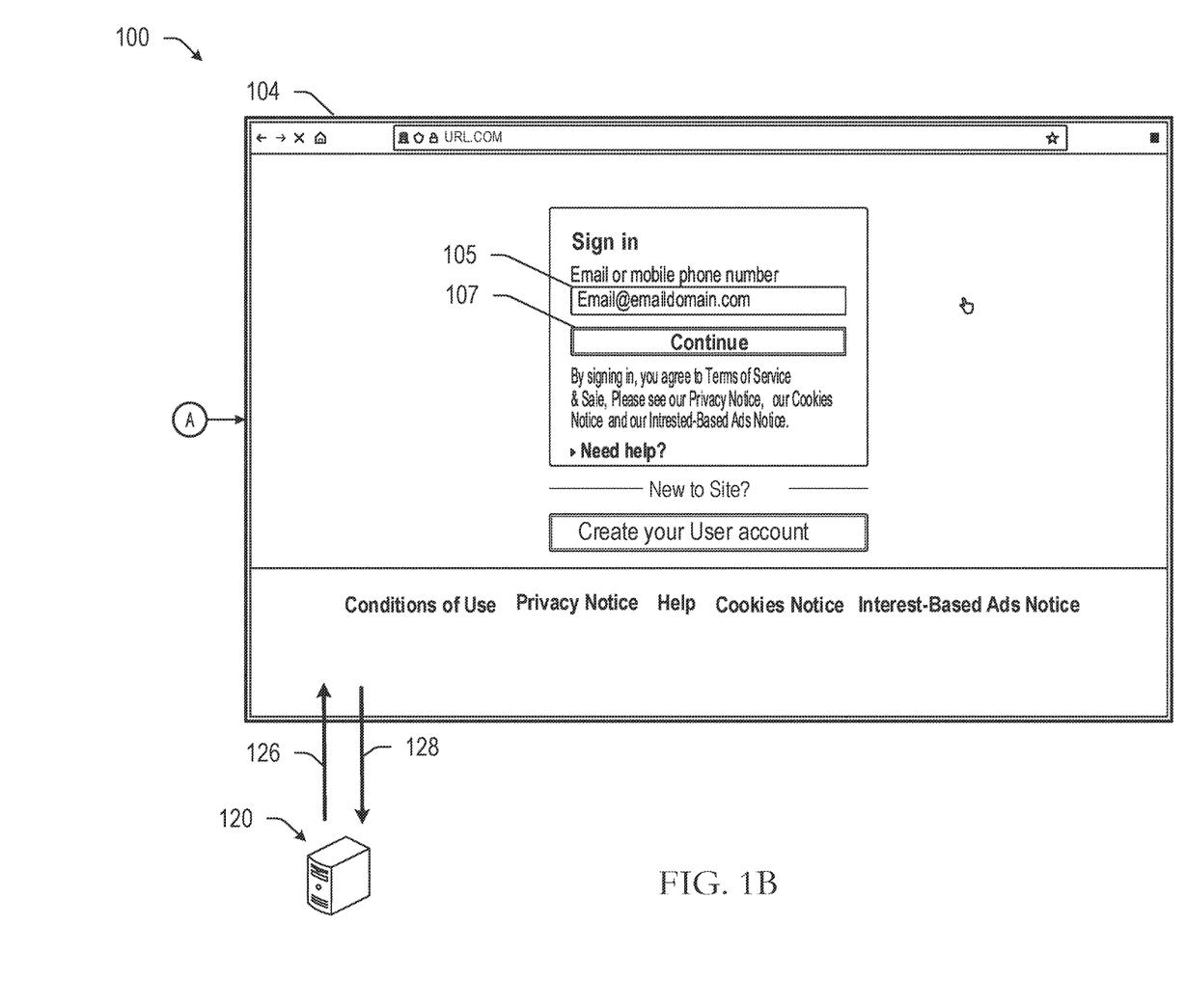

After the UI test has completed performing any desired actions associated with the UI presented on the first web page 102, the UI test may then progress to the second web page 104. As aforementioned, in some instances, the UI test may involve accessing each individual page of the website and testing every UI element associated with each individual web page. In such instances, the second web page 104 may be accessed after all the UI elements associated with the first web as a part of a user journey, such as the user account login and purchase of one specific item user journey described above. In some cases, "progressing" to the second web page 104 may be automatically performed based on an action performed by the UI test within the first web page 102 rather than the UI test sending an instruction specifically to load the second web page 102. For example, an action including a selection of the "sign in" button 103 may navigate the website to the second web page 104. This manner in which different web pages are loaded throughout the user journey may be performed in a similar manner. However, in some cases, the UI test may also send an instruction to load a particular web page as well.

The second web page 104 shows a user login page that allows a user to enter an email address or phone number and a password to log in to a user account. With respect to this second web page 104, for example, the system 120 may send one or more instructions 126 to enter an email address into a text box 105, select a "continue" button 107, enter a password into a second text box (not shown in the figure), and select a second button to perform the login to the user account (not shown in the figure). The UI test may test various scenarios associated with the user account login, such as entering an incorrect email address and/or password to trigger an "invalid login credentials" web page, or entering a correct email address and password to perform a successful user account login. The system 120 may receive one or more results 128 to the actions performed based on the one or more instructions 126.

Figure 1C:
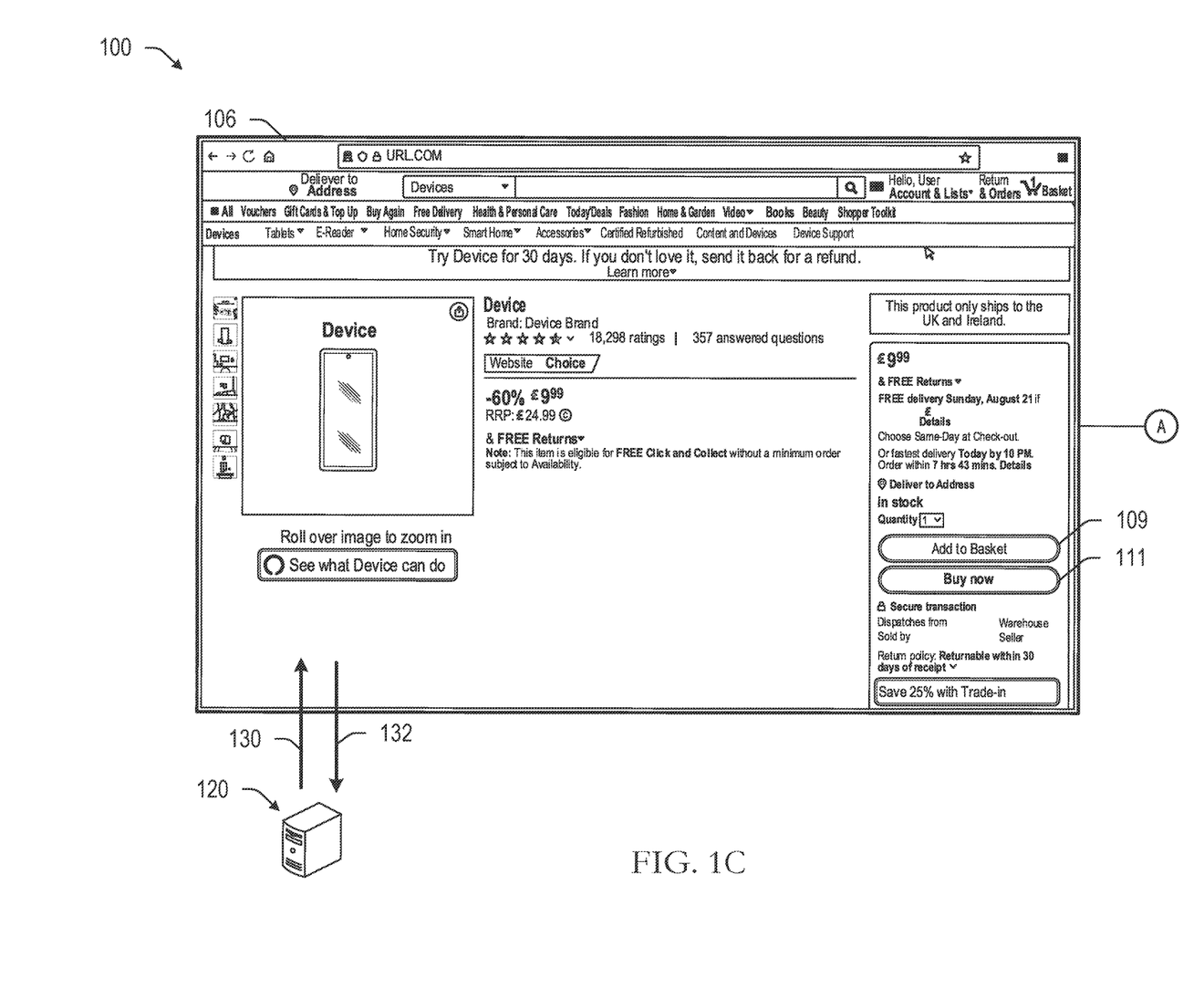
Figure 1D:
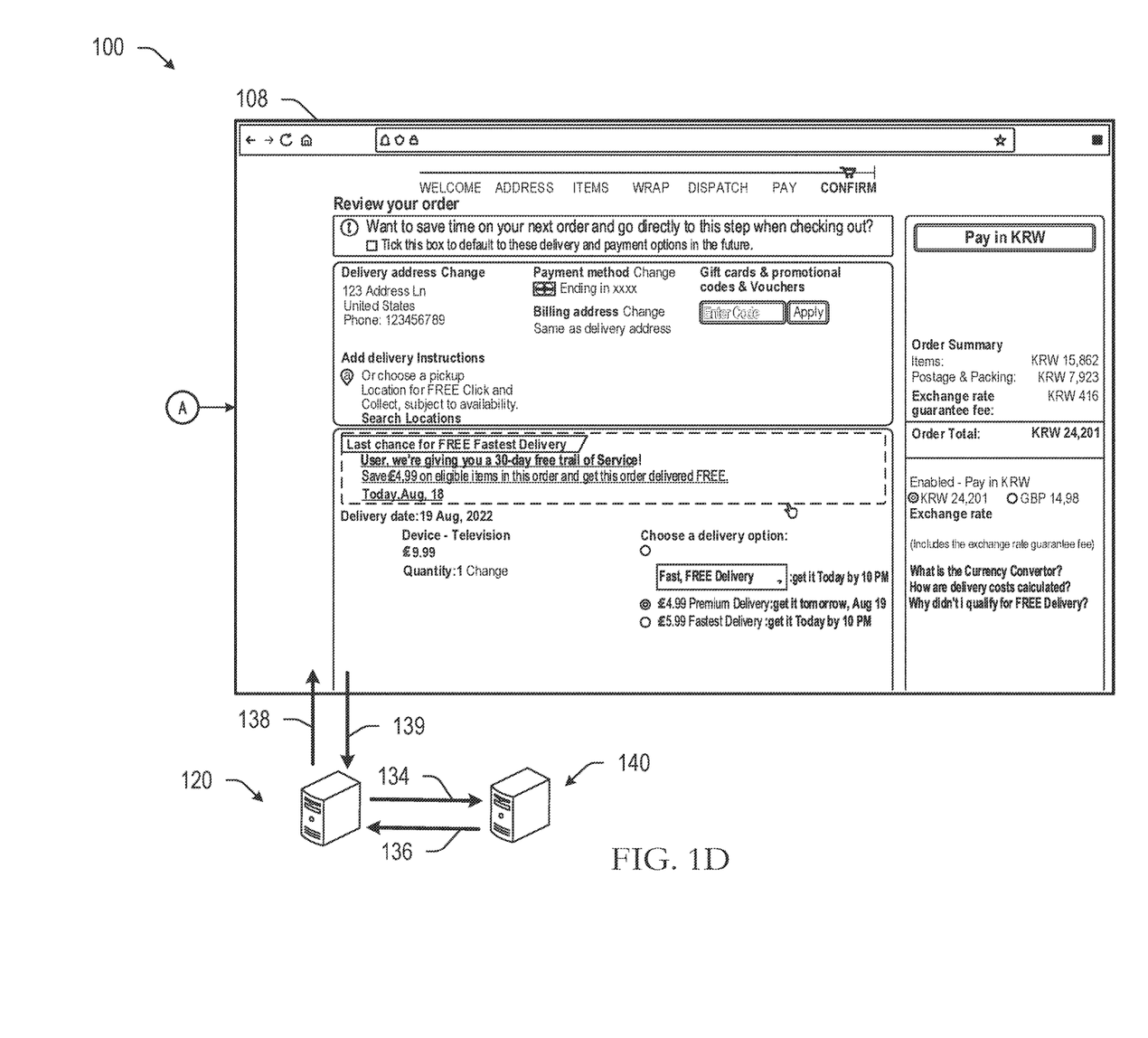

Continuing with FIGS. 1C-1D, a third web page 106 and a fourth web page 108 of the website are also shown. The third web page 106 is a detailed product page for a specific product. The detailed product page includes information about the product, images depicting the product, user reviews of the product, a pricing for the product, stock availability information, and/or any other information that may be relevant to a user who may desire to purchase the product. Any of this information may generally be referred to as "state information" herein. The third web page 106 may also include a first selectable button 109 to add the product to a virtual shopping cart and a second selectable button 111 to proceed directly to a purchase page for the product. In this example user journey, the system 120 may send one or more instructions 130 (and receive one or more results 132) to select the second selectable button, however, a UI test may also involve performing any other number of actions on the third web page 106 as well.

Although not shown in FIGS. 1A-1D, the user journey may also involve additional web pages and/or actions between the user login illustrated in FIG. 1B and the specific product page illustrated in FIG. 1C. For example, once the user account login is complete, the system 120 may send one or more instructions to input a search string into a search bar of the website. Based on the search string being entered, the website may display a web page including various products that are determined to be pertinent to the search string that was entered. An action may then be performed to select one of the products provided in the product listings. Based on the selection action, the website may navigate to the third web page 106.

From the third web page 106, the user journey of the UI test proceeds to the fourth web page 108 (or to any intermediary web pages between the third web page 106 and the fourth web page 108 as mentioned above), which may be a purchase page for the product shown within the third web page 106. The fourth web page 108 may present information about the product included in the virtual shopping cart, billing and shipment information for the user associated with the user account, payment information (such as credit card information), shipping options, and/or any other information relevant to the user when performing the purchase. A page such as the fourth web page 108 may be a candidate for an application security test (such as DAST or any other type of application security test) given that a user may be prompted to manually enter personal information and payment information into the web page. Thus, an API call 134 may be made to a second system 140 (however, the application security test may also be hosted on the system 120 as well) hosting an application security test may be performed specifically for the fourth web page 108 in the UI test. In some cases, the API call 134 may be added into a script associated with the UI test by a user. In other cases, the system 120 may automatically perform the API call 134 based on a determination that the fourth web page 108 allows for a user to enter sensitive information. As aforementioned, the system 120 may determine that an application security test should be performed for a given web page during a UI test based on any number of other factors beyond the web page allowing a user to enter sensitive information as well.

In one or more embodiments, performing the application security test for the fourth web page 108 may involve performing a first API call to obtain information about the fourth web page 108. Specifically, the first API call 138 may involve obtaining a cookie and/or a URL associated with the fourth web page 108. Based on the first API call 138, a response 139 including a URL and any cookies associated with the fourth web page 108 may be obtained. A second API call 134 may then be made to the application security test service, and the cookie and/or URL may be provided to the application security test service through the second API. The application security test may then be performed for the fourth web page 108. Once completed, a result 136 may be provided back to the system 120. The result 136 may indicate either that the fourth web page 108 includes one or more vulnerabilities or does not include any vulnerabilities, for example.

It should be noted that the user journey presented in the use case 100 is a simplified example of a user journey that may be performed by a UI test. A typical user journey may involve navigating to any number of other web pages associated with the web site as well. Additionally, while the use case 100 only shows one API call to an application security test service being performed on the fourth web page 108, any other number of API calls may be made for any other web pages of the web site as well.

Figure 2:
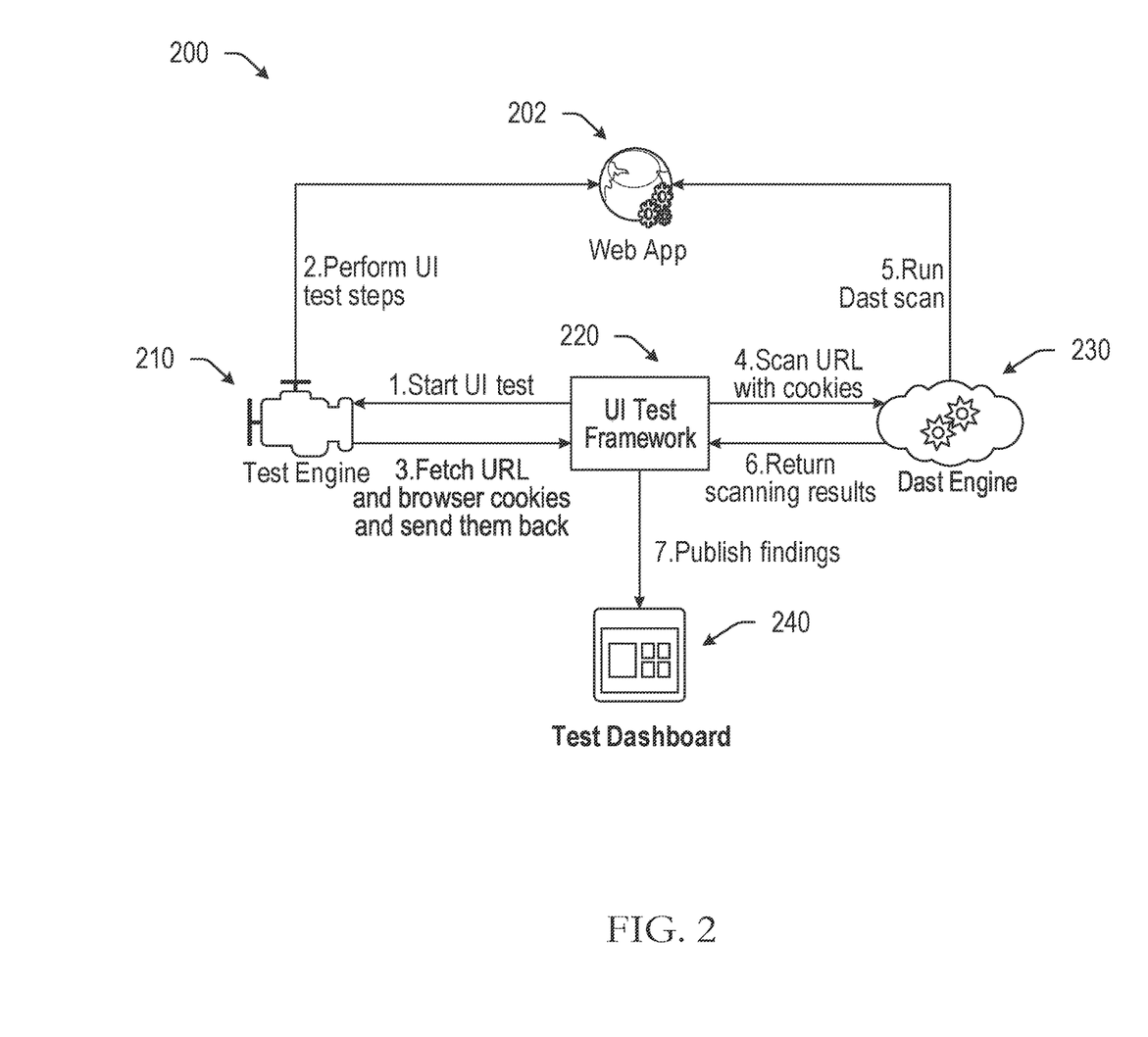
FIG. 2 illustrates an example flow diagram in accordance with one or more example embodiments of the disclosure.

FIG. 2 illustrates an example flow diagram 200 in accordance with one or more example embodiments of the disclosure. Specifically, the flow diagram 200 illustrates operations that may be performed in association with the UI test and embedded application security test as described herein. In one or more embodiments, the flow diagram 200 may involve operations performed between a web application 202 (in some instances, the term "web application" may be used interchangeably with "website" herein), a UI test engine 210, a UI test framework 220, an application security testing engine 230, and a test dashboard 240.

The flow diagram 200 begins with operation 202, which involves initiating the UI test by the UI test framework 220. The UI test may be initiated by a user or may be automatically initiated by the UI test framework 220 and/or a system on which the UI test framework 220 is hosted (such as system 120, computing system 320, computing device 500, etc.). After the UI test is initiated, operation 204 involves automatically performing the various steps associated with the UI test by the UI test engine 210. For example, as illustrated in FIGS. 1A-1D, the UI test may involve accessing various web pages associated with the web application 202, performing one or more actions with respect to the web pages, and determining any results of the one or more actions in order to validate the functionality of the UI for the web application 202. For example, the web application 202 may be the online retail shopping platform shown in the use case 100 of FIGS. 1A-1D, however, any other web application may also be applicable.

Operation 206 involves the UI test engine 210 sending a request to the UI test framework 220 for a URL and/or any cookies associated with the current web page of the web application 202 that is being tested by the UI test engine 210. That is, when the UI test reaches the point at which an application security test is to be performed, the UI test may pause and the UI test engine 210 may request the URL and/or any cookies associated with the web page. The UI test framework may then provide the URL and/or any cookies back to the UI test framework 220. As aforementioned, the points within the UI test at which the application security test is to be performed may be based on application security test API calls that are embedded within the UI test. These API calls may be manually added by a user or may be automatically added to certain points within the UI test based on various factors described above.

In some cases, the UI test may not require the API calls to be added before the UI test is initiated, but may rather make real-time determinations as to whether an application security test is required at various points throughout the user journey associated with the UI test. For example, rather than the UI test automatically reviewing the web pages associated with a user journey to be tested before the UI test initiates, the UI test may perform the same determinations as the UI test is being performed.

Operation 208 involves the UI test framework 220 sending the URL and/or any cookies (and/or any other information) to the application security testing engine 230. Operation 210 involves the application security testing engine 230 performing the application security test for the particular web page using the URL and/or any cookies received from the UI test framework. Operation 212 involves providing any results of the application security test to the UI test framework 220. Finally, operation 214 involves presenting the results of the application security test on the test dashboard 240.

Figure 3:
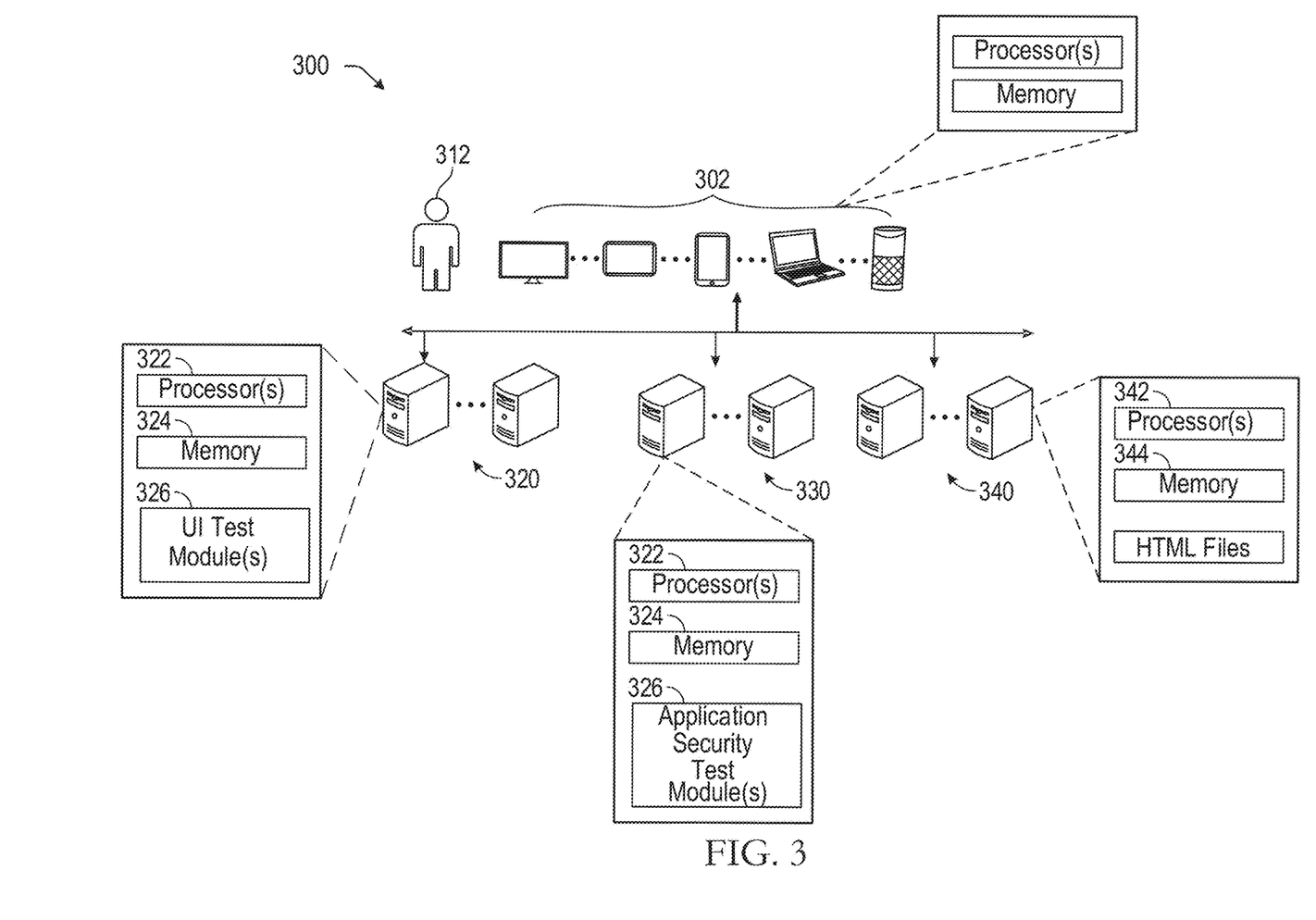
FIG. 3 illustrates an example system architecture in accordance with one or more example embodiments of the disclosure.

FIG. 3 is an illustration of an example system 300 in accordance with one or more example embodiments of the disclosure. In one or more embodiments, the system 300 may include at least one or more user devices 202 and one or more computing systems (for example, computing system 320, computing system 330, computing system 340, and/or any other computing system). However, these elements of the system 300 are merely exemplary and are not intended to be limiting in any way. For simplicity, reference may be made hereinafter to a "user device 302," a "computing system 320," a "computing system 330," and "computing system 340," however, this is also not intended to be limiting and may still refer to any number of such elements.

The user device 302 may be any type of device (for example, a desktop or laptop computer, tablet, smartphone, and/or any other type of device) that is used by a user 312 to perform UI testing and/or application security testing as described herein. The user device 302 may include a script including a series of instructions used to perform the UI testing and/or application security testing. In one or more embodiments, the script may also allow for automated UI testing and/or application security testing without requiring user interaction (for example, the user 312 is not required to manually "click-through" the user journey to facilitate the testing). This script may also be provided on any of the computing systems 320, 330, and 340 (and/or any other device or system described herein) as well.

The computing system 320 may be a local or remote system (for example, a server and/or any other type of computing system) that is used to perform any of the functionalities described herein with respect to the UI testing. In some cases, the computing system 320 may be the same as the UI test engine 210 and/or the UI test framework 220 shown in FIG. 2 (or the computing system 320 may host the application UI test engine 210 and/or the UI test framework 220) The computing system 320 may host one or more UI test module(s) 326 that may be used to perform UI testing for a website and/or make an API call to perform an application security test for a particular web page). The computing system 320 may also include one or more processors 322 and memory 324.

The computing system 330 may be a local or remote system that is used to perform any of the functionalities described herein with respect to the application security testing. In some cases, the computing system 330 may be the same as the application security test engine 230 shown in FIG. 2 (or the computing system 330 may host the application security test engine 230). The computing system 330 may host one or more application security test module(s) 336 that may be used to perform application security testing for a website. That is, any application security testing API calls made during a UI test may be directed towards the computing system 330. The computing system 330 may also include one or more processors 332 and memory 334 as well.

The computing system 340 may be a local or remote system that may host one or more HTML files 326 associated with a website that is being tested using the UI test module(s) 326 and/or the application security test module(s) 326. For example, the computing system 340 may be associated with the web application 202 shown in FIG. 2. The computing system 320 may also include one or more processors 342 and memory 344.

In one or more embodiments, any of the elements of the system 300 (for example, the user device 302, computing systems 320, 330, and 340, and/or any other element described with respect to FIG. 3 or otherwise) may be configured to communicate via a communications network 350. Examples of communication networks are further described with respect to FIG. 5. Finally, any of the elements of the system 300 may include any of the elements of the computing device 500 as well.

Figure 4:
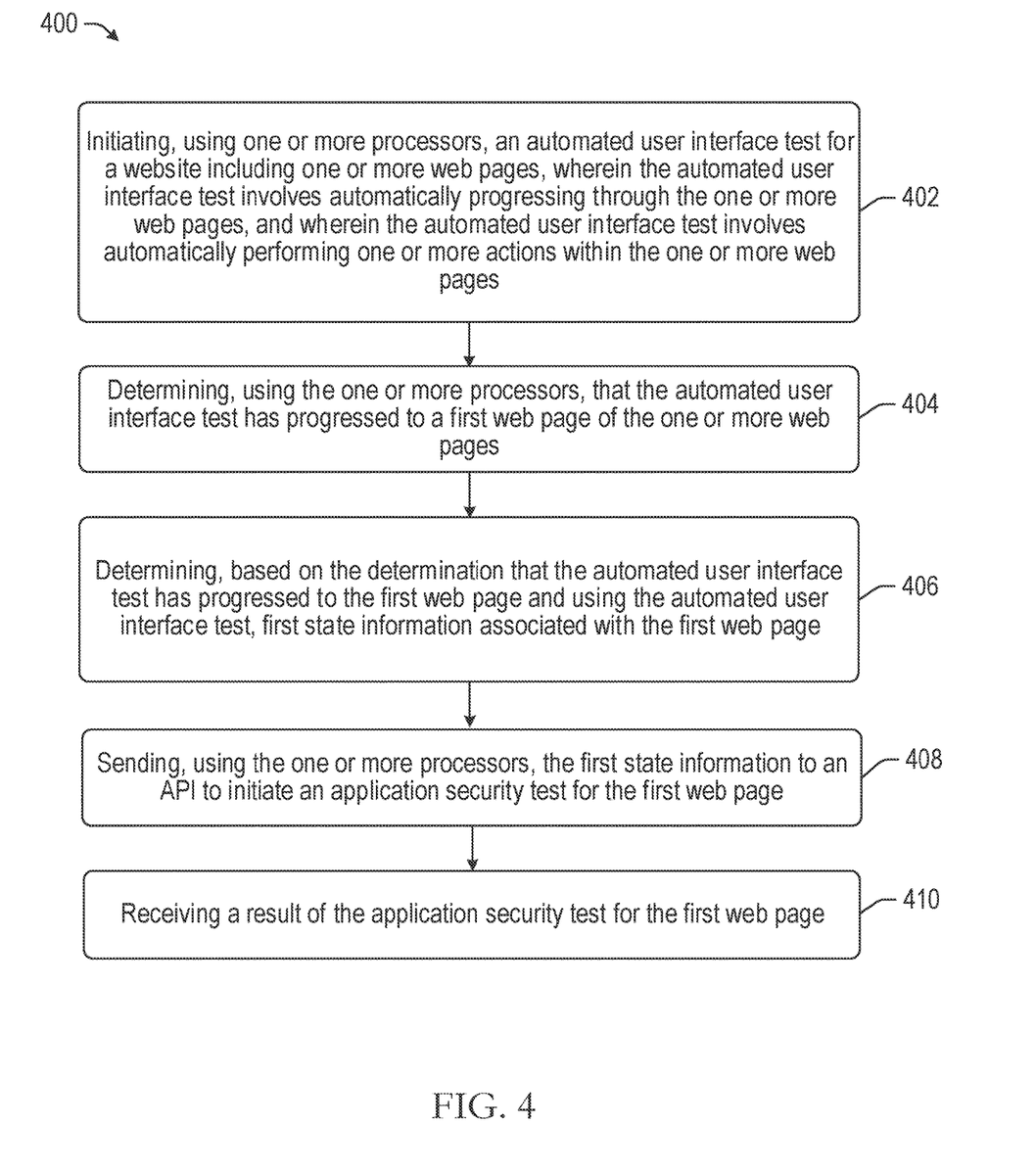
FIG. 4 illustrates an example method in accordance with one or more example embodiments of the disclosure.

FIG. 4 depicts an example method 400 in accordance with one or more example embodiments of the disclosure. The method 400 may be performed using computer-executable instructions stored on the memory of a device or system (for example, user device 302, computing systems 320, 330, or 340, computing device 500, and/or any other device or system described herein or otherwise).

At block 402 of the process flow 400, computer-executable instructions stored on the memory of a device or system may be executed to initiate, using one or more processors, an automated user interface test for a website including one or more web pages, wherein the automated user interface test involves automatically progressing through the one or more web pages, and wherein the automated user interface test involves automatically performing one or more actions within the one or more web pages. For example, the UI test may automatically progress through one or more user journeys as described herein. While progressing through a given user journey, the UI test may send instructions to automatically perform certain actions within a web page to test various UI elements within the web page.

At block 404 of the process flow 400, computer-executable instructions stored on the memory of a device or system may be executed to determine, using the one or more processors, that the automated user interface test has progressed to a first web page of the one or more web pages.

At block 406 of the process flow 400, computer-executable instructions stored on the memory of a device or system may be executed to determine, based on the determination that the automated user interface test has progressed to the first web page and using the automated user interface test, first state information associated with the first web page. That is, the second web page may be a web page for which it is determined that an application security test should be performed. As mentioned herein, this determination may be indicated by a user manually inserting an API call to an application security test within the point of the UI test when the UI test reaches the second web page. However, the API call may be automatically made without requiring a user to manually embed the API call into the UI test script as well. As part of the process of making the API call to the application security test, a URL and/or any cookies associated with the second web page may be obtained to provide to the application security test.

At block 408 of the process flow 400, computer-executable instructions stored on the memory of a device or system may be executed to send, using the one or more processors, the first state information to an API to initiate an application security test for the first web page. For example, a DAST may be performed for the second web page as described herein.

At block 410 of the process flow 400, computer-executable instructions stored on the memory of a device or system may be executed to receive a result of the application security test for the first web page. For example, a result of the application security test may indicate that either the web page includes one or more potential security vulnerabilities or does not include any security vulnerabilities. It should be noted that although the process flow 400 only describes one application security test being performed for one web page, after the first application security test is performed, the UI test may proceed through the remainder of the user journey. During the remainder of the user journey, any other number of API calls to the application security test may also be made to test any other web pages for security vulnerabilities.

One or more operations of the methods, process flows, or use cases of FIGS. 1-4 may have been described above as being performed by a user device, or more specifically, by one or more program module(s), applications, or the like executing on a device. It should be appreciated, however, that any of the operations of the methods, process flows, or use cases of FIGS. 1-4 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Figure 5:
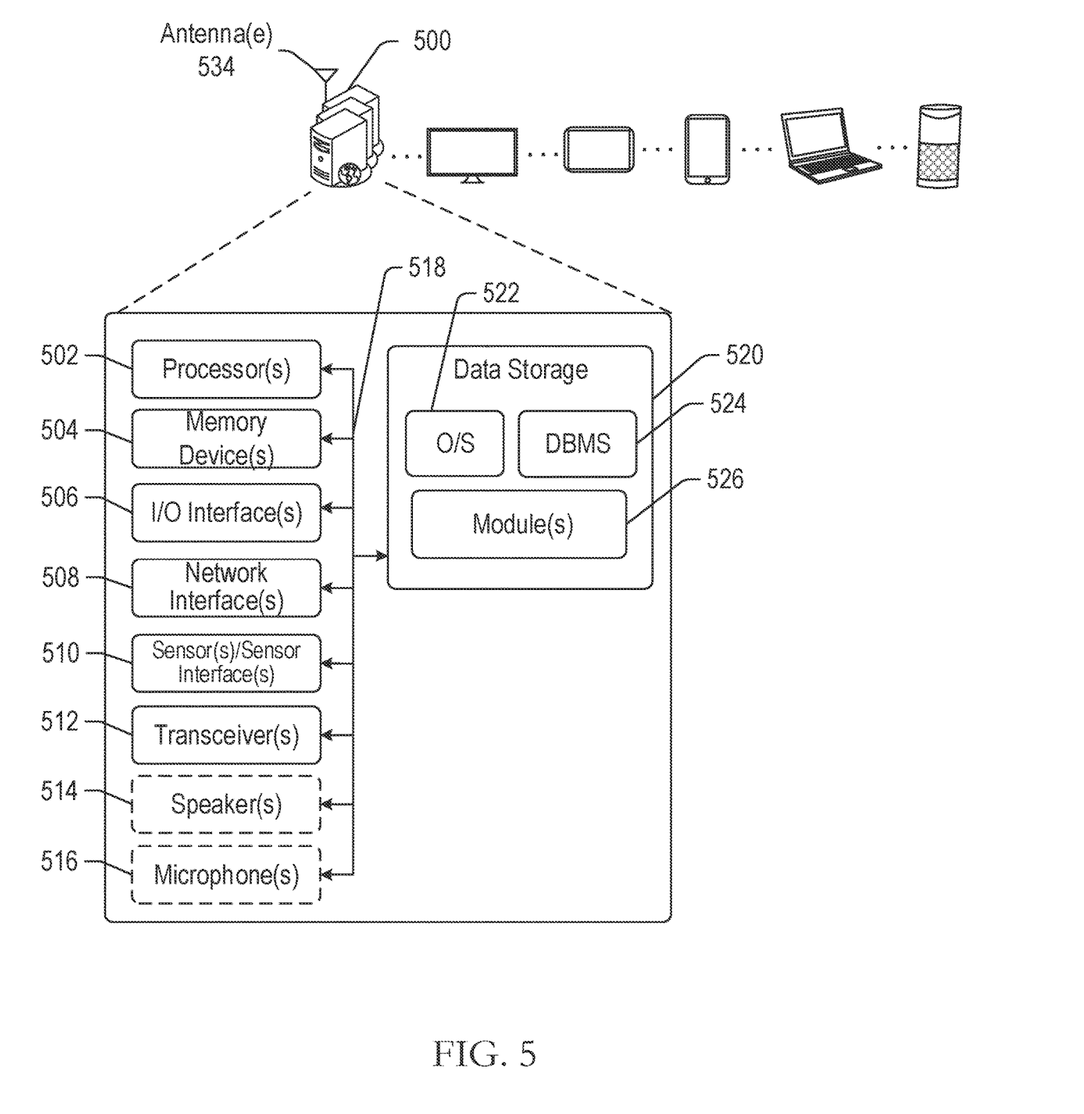
FIG. 5 is a block diagram of an illustrative computing device in accordance with one or more example embodiments of the disclosure.

FIG. 5 is a schematic block diagram of an illustrative computing device 500 in accordance with one or more example embodiments of the disclosure. The computing device 500 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 500 may illustrate various hardware and software components included in any of the devices and/or systems described herein.

The computing device 500 may be configured to communicate via one or more networks with one or more servers, search engines, user devices, or the like. In some embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more optional speakers 514, one or more optional microphones 516, and data storage 520. The computing device 500 may further include one or more buses 518 that functionally couple various components of the computing device 500. The computing device 500 may further include one or more antenna (e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, the memory bus, an address bus, or a message bus, and may permit exchange of information (e.g., data (including computer-executable code), signaling, etc.) between various components of the computing device 500. The bus(es) 518 may include, without limitation, the memory bus or the memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the computing device 500 may include volatile memory (memory that maintains its state when supplied with power) such as random-access memory (RAM) and/or non volatile memory (memory that maintains its state even when not supplied with power) such as read-only memory (ROM), flash memory, ferroelectric RAM (FRAM), and so forth. Persistent data storage, as that term is used herein, may include non volatile memory. In certain example embodiments, volatile memory may enable faster read/write access than non volatile memory. However, in certain other example embodiments, certain types of non volatile memory (e.g., FRAM) may enable faster read/write access than certain types of volatile memory.

In various implementations, the memory 504 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non removable storage including, but not limited to, magnetic storage, optical disk storage, and/or tape storage. The data storage 520 may provide non volatile storage of computer-executable instructions and other data. The memory 504 and the data storage 520, removable and/or non removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for non volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more module(s) 526. Some or all these module(s) may be sub-module(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support the functionality described in reference to correspondingly named components earlier in this disclosure.

The data storage 520 may further store various types of data utilized by components of the computing device 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, purchase history information, user action information, user profile information, a database linking search queries and user actions, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the computing device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the module(s) 526 may include computer-executable instructions, code, or the like that responsive to execution by one or more of the processor(s) 502 may perform functions including, but not limited to, performing any functionality associated with the integrated application security testing as described herein, and the like.

Referring now to other illustrative components depicted as being stored in the data storage 520, the O/S 522 may be loaded from the data storage 520 into the memory 504 and may provide an interface between other application software executing on the computing device 500 and the hardware resources of the computing device 500. More specifically, the O/S 522 may include a set of computer-executable instructions for managing the hardware resources of the computing device 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 500 is a mobile device, the DBMS 524 may be any suitable light-weight DBMS optimized for performance on a mobile device.

Referring now to other illustrative components of the computing device 500, the input/output (I/O) interface(s) 506 may facilitate the receipt of input information by the computing device 500 from one or more I/O devices as well as the output of information from the computing device 500 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna (e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 500 may further include one or more network interface(s) 508 via which the computing device 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna (e) 534 may include any suitable type of antenna depending, for example, on the communications protocols used to transmit or receive signals via the antenna (e) 534. Non-limiting examples of suitable antennas may include directional antennas, non directional antennas, dipole antennas, folded dipole antennas, patch antennas, multiple-input multiple-output (MIMO) antennas, or the like. The antenna (e) 534 may be communicatively coupled to one or more transceivers 512 or radio components to which or from which signals may be transmitted or received.

As previously described, the antenna (e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 534 may be configured to transmit or receive radio frequency signals within any suitable frequency range forming part of the unlicensed portion of the radio spectrum.

The antenna (e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna (e) 534—transmitting or receiving radio frequency (RF) signals in the bandwidth and/or channels corresponding to the communications protocols utilized by the computing device 500 to communicate with other devices. The transceiver(s) 512 may include hardware, software, and/or firmware for modulating, transmitting, or receiving—potentially in cooperation with any of antenna (e) 534—communications signals according to any of the communications protocols discussed above including, but not limited to, one or more Wi-Fi and/or Wi-Fi direct protocols, as standardized by the IEEE 802.5 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the computing device 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 514 may be any device configured to generate audible sound. The optional microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the computing device 500 may include alternate and/or additional hardware, software, or firmware components beyond those described or depicted without departing from the scope of the disclosure. More particularly, it should be appreciated that software, firmware, or hardware components depicted as forming part of the computing device 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    initiating, using one or more processors, an automated user interface test for a website including one or more web pages, wherein the automated user interface test involves automatically progressing through the one or more web pages, and wherein the automated user interface test involves automatically performing one or more actions within the one or more web pages;
    determining, using the one or more processors, that the automated user interface test has progressed to a first web page of the one or more web pages;
    determining, based on the determination that the automated user interface test has progressed to the first web page and using the automated user interface test, first state information associated with the first web page;
    sending, using the one or more processors, the first state information to an application programming interface (API) to initiate an application security test for the first web page; and
    receiving a result of the application security test for the first web page, wherein the result comprises an indication of a security vulnerability associated with the first web page or an indication of a lack of a security vulnerability associated with the first web page.

2. The method of claim 1, further comprising:
    receiving a hypertext markup language (HTML) file associated with the first web page; and
    automatically determining that the application security test will be performed for the first web page based on the HTML file.

3. The method of claim 2, wherein automatically determining that the application security test will be performed for the first web page further comprises:
    determining that a portion of the first web page is configured to receive user information through a user input field of the first web page.

4. The method of claim 1, further comprising:
    receiving, using the automated user interface test, second state information associated with a second web page; and
    sending the second state information to the API to initiate the application security test associated with the second web page.

5. The method of claim 1, wherein it is pre-determined that an application security test will be performed for the first web page before initiating the automated user interface test.

6. The method of claim 1, wherein the first state information comprises at least one of: a cookie, a uniform resource locator (URL), and local storage data.

7. The method of claim 1, wherein the application security test is a dynamic application security test (DAST).

8. A system comprising:
    memory that stores computer-executable instructions; and
    one or more processors configured to access the memory and execute the computer-executable instructions to:
        initiate an automated user interface test for a website including one or more web pages, wherein the automated user interface test involves automatically progressing through the one or more web pages, and wherein the automated user interface test involves automatically performing one or more actions within the one or more web pages;
        determine that the automated user interface test has progressed to a first web page of the one or more web pages;
        determine, based on the determination that the automated user interface test has progressed to the first web page and using the automated user interface test, first state information associated with the first web page;
        send, using the one or more processors, the first state information to an application programming interface (API) to initiate an application security test for the first web page; and
        receive a result of the application security test for the first web page, wherein the result comprises an indication of a security vulnerability associated with the first web page or an indication of a lack of a security vulnerability associated with the first web page.

9. The system of claim 8, wherein the one or more processors are further configured to execute the computer-executable instructions to:
    receive a hypertext markup language (HTML) file associated with the first web page; and
    automatically determine that the application security test will be performed for the first web page based on the HTML file.

10. The system of claim 9, wherein automatically determine that the application security test will be performed for the first web page further comprises:
    determine that a portion of the first web page is configured to receive user information through a user input field of the first web page.

11. The system of claim 8, wherein the one or more processors are further configured to execute the computer-executable instructions to:
    receive, using the API, second state information associated with a second web page; and
    send the second state information to the API to initiate the application security test associated for the second web page.

12. The system of claim 8, wherein it is pre-determined that an application security test will be performed for the first web page before initiating the automated user interface test.

13. The system of claim 8, wherein the first state information comprises at least one of: a cookie, a uniform resource locator (URL), and local storage data.

14. The system of claim 8, wherein the application security test is a dynamic application security test (DAST).

* * * * *